July 31, 1928.
E. F. CHANDLER
REMOTE CONTROL SYSTEM
Filed June 21, 1923
1,678,634
2 Sheets-Sheet 1
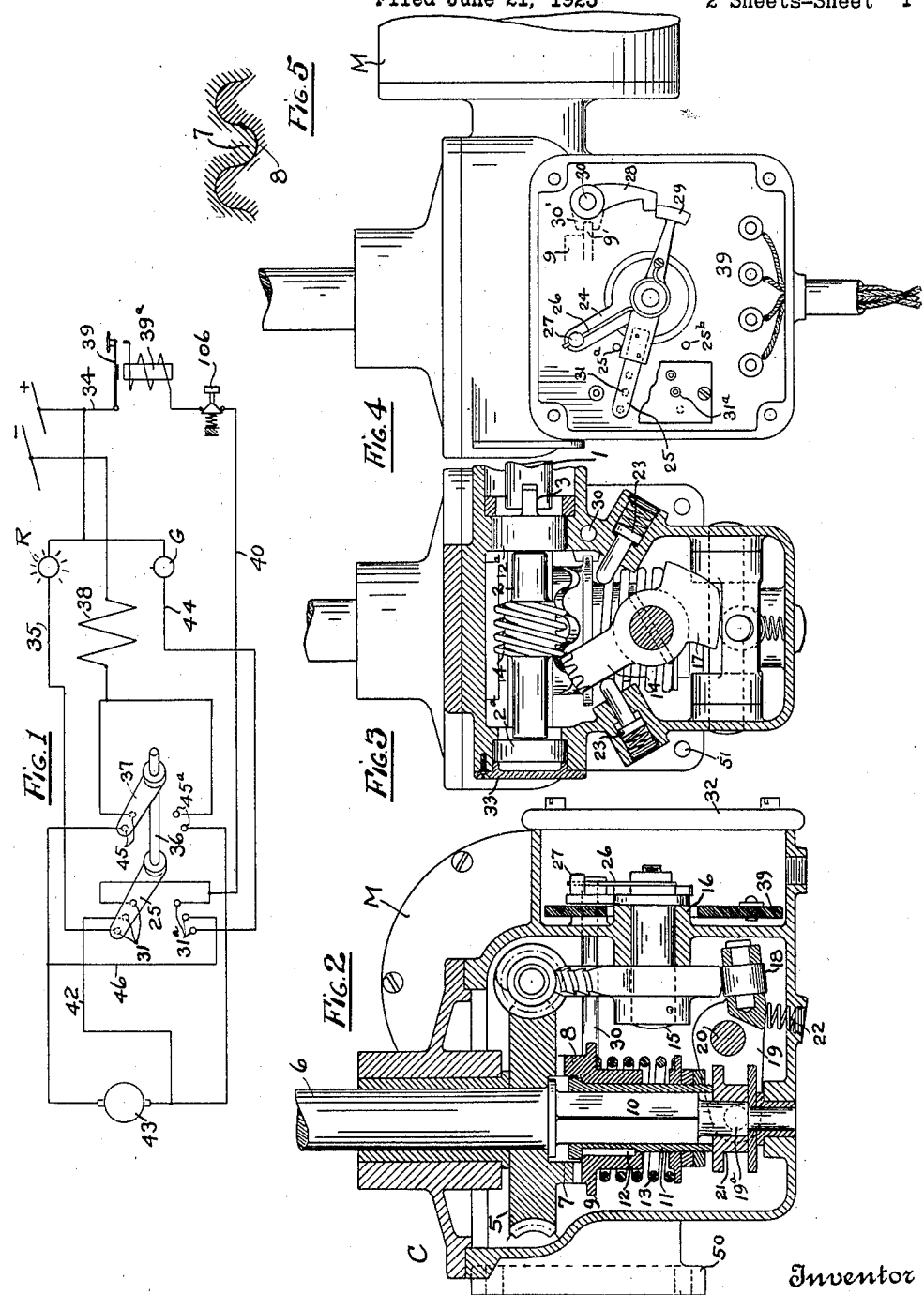
Inventor
Edward F. Chandler
By his Attorneys July 31, 1928.
E. F. CHANDLER
1,678,634
REMOTE CONTROL SYSTEM
Filed June 21, 1923
2 Sheets-Sheet 2
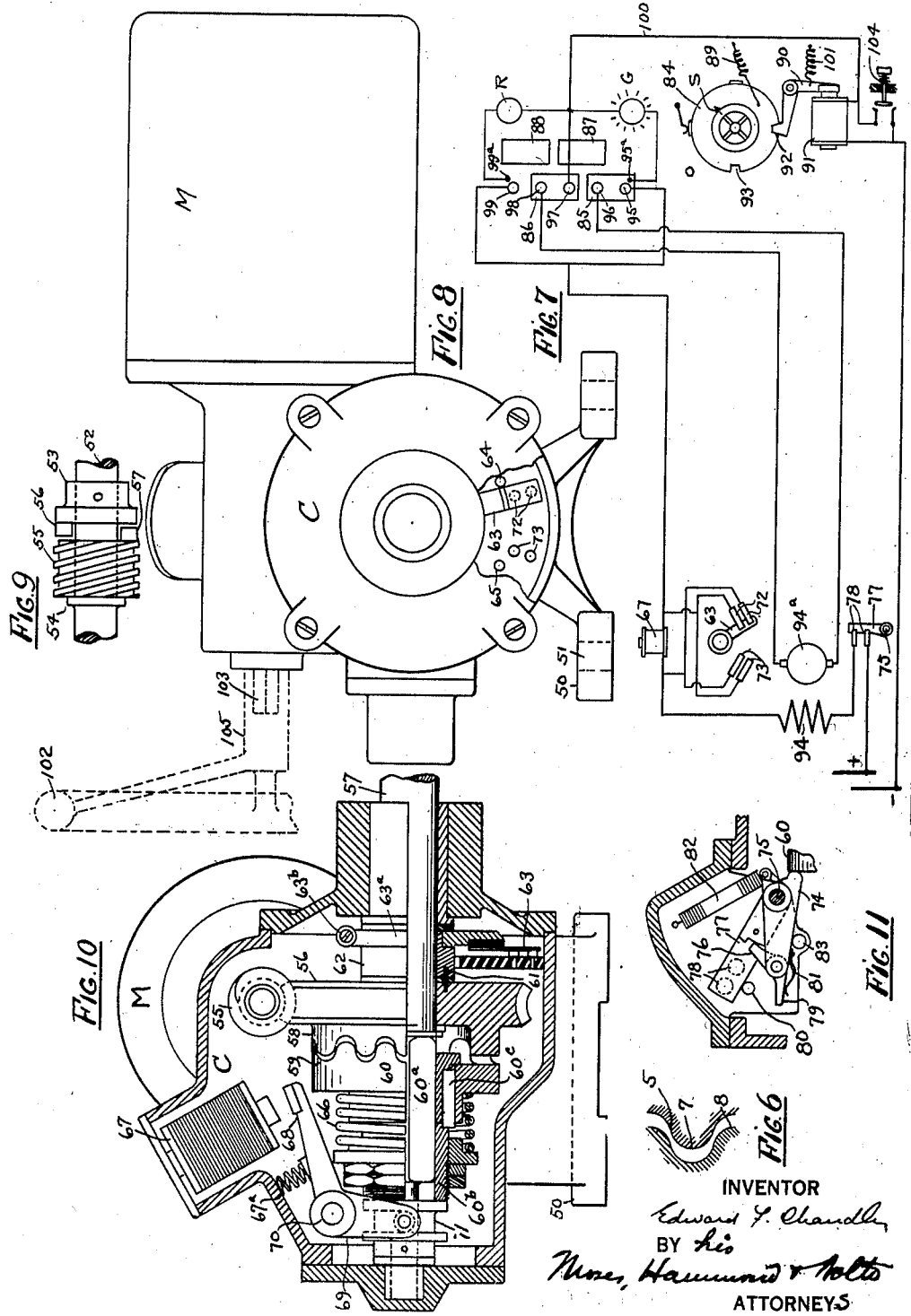
INVENTOR
Edward F. Chandler
BY his
Moses, Hammond & Nolte
ATTORNEYS Patented July 31, 1928.

1,678,634

UNITED STATES PATENT OFFICE.

EDWARD F. CHANDLER, OF BROOKLYN, NEW YORK.

REMOTE-CONTROL SYSTEM.

Application filed June 21, 1923. Serial No. 646,749. REISSUED

This invention relates to remote control systems for operating valves and similar mechanism.

It is one of the objects of the invention to prevent jamming or breaking of the valve parts by overdriving at the end of the opening or closing movement and to prevent overloading of the motor.

In the preferred embodiment, a slip clutch is provided which is rendered substantially non-slipping when the valve is being started from its open or closed position or during the travel of the valve but which is designed to slip when the valve nears the limit of its movement in either direction. The slipping of the clutch as the valve nears the limit of its movement automatically turns off the power to the motor to stop further driving of the clutch mechanism and prevent jamming or breaking of the valve or control unit.

Certain features disclosed but not claimed herein relating to the signal system are disclosed and claimed in my pending application, Serial No. 578,402, for remote control system, filed July 29, 1922, and certain features relating to the valve controlling mechanism are disclosed and claimed in my pending application, Serial No. 590,854 for remote control systems, filed September 27, 1922.

In the drawings:

Fig. 1 is a diagrammatic view of one form of wiring circuit for the control system, using a mechanically controlled clutch.

Fig. 2 is a sectional view of the control unit along the valve drive shaft showing the means for rendering the clutch non-slipping when starting the valve from open or closed position.

Fig. 3 is a partial sectional view along the motor shaft.

Fig. 4 is a side view of the control switch and panel board for automatically stopping the motor and setting the circuit for reverse operation when the clutch begins to slip.

Fig. 5 is a detail showing the clutch in non-slipping position.

Fig. 6 is a detail showing the clutch in slipping position.

Fig. 7 is a diagrammatic view of one form of wiring circuit in which an electrically controlled clutch is used.

Fig. 8 is a plan view of the control unit.

Fig. 9 is a detail showing of the lost motion connection between the motor shaft and the worm.

Fig. 10 is a part sectional view of the clutch.

Fig. 11 is a detail of the circuit controlling mechanism.

In the embodiment illustrated in Figs. 1 to 6, the operating mechanism comprises a motor M and the control unit C. The motor shaft 1 is detachably connected to a worm shaft 2 in the control unit by the connection 3 so that the motor may be quickly removed from the control unit for repairs, and other purposes.

The worm shaft 2 mounted in ball bearings $2^a$ carries a worm 4 which meshes with a worm wheel 5 loosely mounted upon the valve drive shaft 6 which by means of suitable external gearing is connected so as to drive the valve. In order to rotate the shaft 6, the face of worm wheel 5 is provided with clutch teeth 7 which cooperate with the clutch teeth 8 upon the slip clutch 9. As illustrated in Figs. 5 and 6, the clutch teeth are so designed as to be substantially non-slipping when in fully engaged position but are designed so as to slip in the the partially engaged position when a predetermined resistance is met with in the valve operation.

The shaft 6 is provided with a squared portion 10 upon which the sleeve 11 is slidably mounted, so as to render the slip clutch 9 substantially non-slipping when the sleeve 11 is slid on the shaft toward the worm wheel 5.

The slip clutch 9 is keyed to turn with the sleeve 11 by a key 12 which permits longitudinal movement between the clutch and sleeve. A spring 13 urges the clutch toward the partially engaged position illustrated in Fig. 6 and is of sufficient strength to hold the clutch in partially engaged position to ordinarily keep the valve in motion when it has been started from one position to the other, but will permit the clutch to slip when the further movement of the valve is obstructed as by the valve reaching the limit of its movement in either direction.

To render the clutch substantially non-slipping when the most power is needed as, for instance, to start the valve from its open or closed position, means are provided for sliding the sleeve 11 upwardly on the squared portion 10 when the motor is started, to cause full engagement of clutch teeth 7 and 8, as illustrated in Fig. 5. This means comprises a gear sector 14 fixed upon a shaft 15 rotatable in a bearing 16 in the control unit casing. When the motor M is started and the sector 14, meshing with the worm 4 is turned from one side of the casing to the other, the cam 17 upon the opposite end of the sector 14 rides upon the roller 18 in one end of the forked clutch operating lever 19 and causes the lever to turn upon its pivots 20 to elevate the grooved collar 21, into which studs 19ª on the clutch lever project upon shaft 6 and push the sleeve 11 upwardly to cause full engagement of the clutch teeth during the starting movement. When the heel of the cam 17 passes over the roller 18 the spring 22 forces the end of lever 19 upward to partially disengage the clutch. However, by this time the valve has been started toward its desired position and the action of spring 13 holding the clutch in partially engaged position is strong enough to keep the valve in motion until it reaches the limit of its movement.

In some instances, as for the control of high pressure fluids, it may be necessary to prevent any chance of the clutch slipping before the limit of valve travel has been reached, in which event obviously, the cam can be adjusted by increasing the dwell on the highest part, so that the clutch is retained in the positive driving position throughout substantially the entire travel of the valve.

While for the purpose of this application, the cam is illustrated as driven by the worm direct and hence the travel is relatively fast, it will be understood that by well known means, the travel of the cam may be timed to correspond to any desired valve travel.

The sector 14 in either of its extreme positions is urged inwardly toward the worm 4 by the spring pressed plungers 23 so that when the motor is reversed after driving the sector to one side, the sector is in position to mesh with the worm rotating in the opposite direction to be driven to the other side and start the valve in the opposite direction.

It is to be noted that by this arrangement the motor is speeded up and has started to turn the sector 14 before the full load is applied so as to prevent stalling the motor by throwing on the full load too soon. The cam 17 is suitably shaped to prevent the clutch slipping when the motor has just started.

In order to shut off the power to the motor when the clutch begins slipping, the end of stud shaft 15 which extends through the bearing 16 is provided with an arm 24 which rotates therewith and with an insulated contact arm 25 loosely pivoted on the shaft. The arm 25 is moved by a spring 26 wound on the shaft 15, and attached at one end to arm 25 and at the other to the stud 27 on the arm 24. As the arm 24 is rotated in either direction, energy is stored in the spring 26 which tends to rotate the contact arm 25 in the same direction. This motion of the arm is prevented by the dog 28, fixed on the end of a shaft 30 extending through the panel board 39, which projects into the path of the catch 29 upon the end of contact arm 25. The rod 30 is provided with a slotted lug 30' which fits over the ring 9' of the clutch 9 and when the clutch begins slipping at the end of the valve movement, the jumping thereof causes the rod 30 to turn and swing the dog 28 aside to release the catch 29 and allow the contact arm 25 to snap off the contacts 31 and shut off the power to the motor. Stops 25ª and 25ᵇ limit the movement of the arm 25 so that it always bridges contacts 31 or 31ª except for the short time it takes for arm 25 to snap from one position to the other. Detachable cover plates 32 and 33 are provided to give ready access respectively, to the panel board 39 and to the ball bearing 2ª for worm shaft 2.

Fig. 1 illustrates diagrammatically the position of the parts when the valve is closed and the motor stopped. The current coming in through the lead 34 passes along the conductor 35 and through the light R, which is of high resistance, to the contact arm 25, thence along the conductor 42, through the armature 43 to the contacts 45 and arm 37, then through the field 38 back to the line. The high resistance of the lamp R permits only a feeble current to flow through the motor, and the control unit is not moved by this current. When the operator desires to open the valve he closes the magnetic switch 39 which sends the current along the conductor 40 to the contacts 31, along conductor 42 through the armature 43 back to contacts 45, arm 37 and thence through the field 38 to the line. The current thus shunted around the lamp R is sufficient to start the opening movement. When the valve reaches its open position, the slipping of the clutch removes the dog 28 from the path of catch 29 and allows the contact arm 25 and the arm 37, which is connected thereto by the rod 36, to snap over to the contacts 31ª and 45ª, respectively. The momentary break in the circuit de-energizes the magnet 39ª and permits the switch 39 to open and shut off the current to the motor.

In this position of the arms 25 and 37, the current flows through the lamp G along conductor 44 to contacts 31ª along lead 46 through the armature 43 in reverse direction to the contacts 45ª, arm 37, field 38 and back to the line. The high resistance of the lamp G also prevents movement of the motor until the switch 39 is again closed to shunt the current around the lamp. When the switch is closed the current flows along the conductor to the contacts 31ª, through lead 46 reversely through the armature 43, contacts 45ª and back through field 38 to the line to operate the motor in the reverse direction and close the valve. At the end of the closing operation the slipping of the clutch again permits arms 25 and 37 to snap over to contacts 31 and 45 respectively, to set the circuit for the next opening of the valve.

It is to be noted that one of the lamps is always glowing except during the opening or closing movement to indicate to the operator the position the valve is in.

A hand switch 106 is provided in conductor 40 to cut off the current and stop the movement of the valve in any position.

In both modifications M designates the motor and C the control unit and both units are provided with a flange 50 having holes 51 for quick attachment to the valve casing.

The modification illustrated in Figs. 7 to 11 comprises a similar slip clutch with electrical means for rendering it substantially non-slipping when the valve is being set in motion.

The motor shaft 52 is provided with collars 53 and 54 between which the worm 55 is loosely carried on the shaft. A lug 56 upon the collar 53 cooperates with the lug 57 on the worm to form a loose driving connection between the motor and the worm to allow a certain amount of lost motion in starting the valve to permit the motor to pick up speed before the load is applied.

The worm 55 drives the worm wheel 56, which loosely rotates on the valve drive shaft 57. Upon one face the worm wheel carries a set of clutch teeth 58 adapted to cooperate with the teeth 59 of the clutch 60 to drive the shaft, as will be described later. The other face of the worm wheel is doweled at 61 to the collar 62 which also is loose upon the drive shaft 57.

Frictionally mounted upon the collar 62 by means of a split band 63ª connected by the screw 63ᵇ, is an insulated contact arm 63 which turns with the collar from stop 64 to stop 65 or vice versa, but slides on the collar when in contact with either stop. The screw 63ᵇ enables the band 63ª to be quickly adjusted to the proper pressure upon the collar 62.

The clutch teeth 59 are held in partial engagement with the teeth 58 by the spring 66 which acts similar to spring 13 of Figs. 1 to 4 to permit slipping of the clutch under certain conditions, and in order to prevent slipping when most power is needed to start the valve from its seat or at open position, a magnet 67 is provided to throw the clutch into full engagement.

The construction of the clutch 60 is substantially like that illustrated in Fig. 2 which has been described in detail and comprises a similar squared shaft 60ª, sleeve 60ᵇ, spline key 60ᶜ, etc.

When the magnet is energized it draws up the armature 68 to turn the clutch lever 69 about its pivot 70 to cause the grooved collar 71 to slide along the valve drive shaft and force the clutch teeth into full engagement, spring 67ª serving to partially release the clutch when the magnet is de-energized.

In operation the contacts 72 and 73 serve to short circuit the magnet 67 when bridged by the contact arm 63 so that when the motor is started the magnet is short circuited through the contacts 72. However, as the arm 63 is turned off the contacts 72 the magnet is energized to push the clutch into full engagement to prevent slipping while the valve is started from its seat. Meanwhile the arm 63 turns to position to bridge contacts 73 and again short circuit the magnet which causes a partial release of the clutch to permit slipping and prevent breakage or jamming when the valve reaches the limit of its movement.

The slipping of the clutch, when the valve reaches the limit of its opening or closing movement, kicks the lever 74 (see Fig. 11), which is pivoted in the casing at 75 and causes the pawl nose 76 to push the contact arm 77 off the contacts 78 to break the circuit and stop the motor. The pawl nose 79, however, coming in contact with the stop 80 causes the pawl to turn on its pivot against the influence of spring 81 to release the nose 76 from the arm 77 and permit the spring 82 to return the arm to the contacts 78 to set the circuit for the next operation of the valve, as will now be described. The stop 83 is provided to limit the downward movement of lever 74.

A drum controller 84, having contacts 85, 86, 87 and 88, is used to control the circuits for opening or closing the valve. The controller is biased to neutral position by the spring 89 and is held in operating position by the armature dog 90 controlled by magnet 91, which fits in notches 92 and 93 upon the drum. Signal lights G and R, which may be green and red, are provided for indicating, respectively, that the valve is being opened or closed.

In operation, the controller is turned to the position indicated in Figure 7 and locked by the dog 90. The current flows through the switch 77, field 94, and is short circuited around magnet 67 through contacts 72 to the contact 95, thence to contact 96 through the motor armature 94ª and back to contact 86 through contact 97, along lead 100 to magnet 91 and back to the line. As the motor begins turning, the arm 63 is moved off the contacts 72, as before described, to send the current through magnet 67 to cause full engagement of the clutch in order to start the valve from its seat. When the contact arm 63 reaches the contacts 73 the magnet 67 is again short circuited and the clutch is partially released, however, the valve is now in motion and the partial engagement of the clutch is sufficient to keep it moving until it reaches the limit of its stroke, when the resistance to further driving will cause the clutch to slip and kick the arm 77 off the contacts 78 to de-energize the magnet 91. The spring 101 then releases the dog 90 and the controller 84 is pulled back to neutral position by the spring 89. Meanwhile the arm 77 has returned to the contacts 78 to reset the circuit for the next operation, when the drum 84 is again turned to move the valve. During the movement of the valve just described, a shunt current flows through the lamp G to indicate that the valve is being opened and when the drum 84 is turned to its neutral position, at the end of the opening movement, the connection at 95ª is broken and the lamp extinguished. To close the valve the operator now turns the drum 84 until the dog 90 slips into the notch 93, whereupon the current flows through the contact 99 across drum contact 88 to 98 and in reversed direction through the motor armature to contact 96 thence through 87 to 97 through lead 100 and back to the line. A shunt current also flows through contact 99ª to the light R to indicate that the valve is being closed. If, when the valve is in open position the operator should set the drum to again open the valve, the switch 63 would remain stationary against stop 94 and the starting of the motor would cause the clutch to slip and kick out switch 77 whereupon the drum would again return to neutral position.

In this modification also, the clutch has been described as being in positive driving position only during the starting of the valve movement; however it is obvious that should it be desirable to continue the positive drive until the valve has reached the limit of its travel, the movement of switch 63 could be so timed or the contacts 72 and 73 so spaced as to keep the clutch engaged for the necessary time.

A hand wheel 102 is provided for manual operation of the valve in emergencies. The end of the motor shaft 103 is squared and fits within a square socket in the hand wheel shaft 105. For manual operation the hand switch 104 is closed to short circuit the magnet 91 and prevent the drum 84 being held in either contact position and the wheel 102 is turned to turn the motor shaft and drive the control mechanism.

While for the purpose of this application the slip clutch mechanism has been shown and described as functioning principally as a means affording substantially positive driving power only during certain limited portions of the travel, it will be understood that I may moreover employ the slip clutch in such a manner that a substantially positive drive is afforded throughout the operation of the valve or other mechanism under control, the slipping feature only being brought into action at the limits of travel.

Thus the inventive idea herein disclosed may be employed in conjunction with a valve operating unit such as disclosed in applications Serial Nos. 578,402 and 590,854, filed July 29, 1922 and September 27, 1922, respectively, in such a manner that when the valve has reached its seat, the slip clutch will become effective so that over travel, as for instance by the momentum of the motor armature, would be prevented, after the limit switch shown therein has functioned to stop the operation.

The invention has been described herein with particular reference to the operation of valves, but it will be understood that the invention is not limited to such use, but may be employed in conjunction with any other suitable devices as are well known in the art.

Although I have herein shown and described only certain specific forms of embodiment of my invention, it will be expressly understood that many changes and modifications may be made within the scope of the appended claims without departing from the spirit and scope of the invention, it being my intention to claim the same as broadly as the state of the prior art will permit.

What I claim is:

1. In a reversible device for operating valves and other apparatus, an operating shaft, a motor for driving said shaft, means connecting the shaft and motor and adapted to permit rotation of the motor when the said shaft has been driven to its limit of travel in either direction so as to avoid an undue strain on the motor and its associated parts, means for setting the device into operation in opposite directions and control means operable upon the starting of the motor for positively connecting the motor and shaft regardless of the direction of operation, to initiate rotation of the shaft positively.

2. In a control device, a driven shaft, a motor, a slip clutch between the shaft and motor and motor operated means to prevent the clutch from slipping when the driving of the shaft is initiated.

3. A control unit comprising in combination a motor, a driven shaft, a slip clutch between the motor and shaft, and means operated by the motor independently of the driven shaft and gradually made effective by the motor to render the clutch positive in its action during a predetermined interval of time.

4. A control unit comprising a motor, a driven shaft and a partially engaged clutch between the motor and the shaft, motor operated means to fully engage the clutch when the shaft is being started, and means to release the clutch to partially engaged position to permit slipping thereof when the movement of the driven shaft is obstructed.

5. In a control unit comprising a motor, a driven shaft, and a partially engaged clutch between the motor and shaft, and motor operated means to fully engage the clutch when the shaft is being started, and to release the clutch to partially engaged position to permit slipping thereof after the shaft has been started.

6. In a control unit comprising a motor, a driven shaft and a partially engaged clutch between the motor and shaft, means to fully engage the clutch when the shaft is being started, means to release the clutch to partially engaged position to permit slipping thereof when the shaft reaches the limit of its movement in either direction, and means to stop the motor when the clutch begins slipping.

7. In a control unit, a motor, a driven shaft and means to drive the shaft from the motor comprising a slip clutch, controlling means constructed and arranged to permit the clutch to slip while the motor speeds up from a state of rest, but to prevent the clutch from slipping to apply a full drive to the shaft when the motor has speeded up, and means to restore the clutch to slipping position when the maximum running load has been taken off the motor.

8. In a valve operating unit, a motor, means to drive the valve from the motor in opposite directions including a slip clutch, and means operated by the motor to prevent slipping of the clutch when the valve is being started from either open or closed position.

9. In a valve operating unit, a motor, means to drive the valve from the motor including a slip clutch, motor operated means to prevent slipping of the clutch when the valve is being started from open or closed position, and means to partially release the clutch to permit slipping when the valve approaches the limit of its movement.

10. In a valve operating unit, a motor, means to drive the valve from the motor including a slip clutch, automatic means to prevent slipping of the clutch when the valve is being started from open or closed position, means to partially release the clutch to permit slipping when the valve approaches either limit of its movement, and means to stop the motor when the clutch begins slipping.

11. In a valve operating unit, a motor, means to drive the valve from the motor, means acting on said driving means to apply the full power of the motor when starting the valve from its seat, and means acting on said driving means to prevent further driving of the valve when it reaches the limit of its movement.

12. In a valve operating unit, a motor, means to drive the valve from the motor, a driving train to apply the full power of the motor in a substantially positive manner when starting the valve from its seat, and means rendering the driving train impositive in its action before the valve reaches the limit of its movement.

13. In a control unit, a motor, a valve drive shaft and means to drive the shaft from the motor comprising a slip clutch, and means driven by the motor to render the clutch substantially non-slipping at a predetermined period of its movement.

14. In a control unit, a motor, a valve drive shaft and means to drive the shaft from the motor comprising a slip clutch, and means driven by the motor to render the clutch substantially non-slipping when the shaft is being started and to permit slipping when the valve approaches the limit of its movement in either direction.

15. In a control unit, a motor, a valve drive shaft and means to drive the shaft from the motor comprising a partially engaged slip clutch, a clutch lever attached to move the clutch into full engagement to prevent slipping, and magnetic means operated by the motor to control the clutch lever.

16. In a control unit, a motor, a valve drive shaft and means to drive the shaft from the motor including a clutch, means to normally hold the clutch elements in partial engagement to permit slipping of the clutch when the movement of the drive shaft is obstructed, and magnetic means to move the clutch elements into full engagement to prevent slipping, and means actuated by the motor for controlling the magnet.

17. In a control unit, a motor, a valve drive shaft and means to drive the shaft from the motor including a clutch, means to normally hold the clutch elements in partial engagement to permit slipping of the clutch when the movement of the drive shaft is obstructed, magnetic means to move the clutch elements into full engagement to prevent slipping, and means actuated by the motor to energize the magnet to fully apply the clutch to prevent slipping when the valve is being started from its open or closed position, and to de-energize the magnet after the valve has been started to permit slipping of the clutch when the valve reaches the end of its opening or closing movement.

18. In a control unit for valves and the like, a motor, a valve drive shaft and means to drive the shaft from the motor including slip clutch, automatic means to permit the motor to speed up before the drive shaft is started, automatic means to prevent the clutch from slipping when the maximum running load is being applied to the shaft, means to permit slipping when the valve reaches the limit of its movement, and means to stop the motor when the clutch begins slipping.

19. In a valve control system, a motor and means to drive the valve from the motor including a slip clutch, a switch arm for controlling the circuit to the motor, means to permit slipping of the clutch when the valve reaches the limit of its movement in one direction, and means actuated by the slipping of the clutch to permit the switch arm to stop the motor and reset the circuit for moving the valve in the opposite direction when the circuit is again closed.

20. In a valve operating unit, a motor, a shaft driven by the motor, a slip clutch between the motor and shaft, means for causing the clutch to drive without slipping, means for setting the clutch so that slipping will occur when the valve is driven to its seat, and means operable when the valve has been so driven, to automatically interrupt the supply of power to the motor.

21. A unitary driving mechanism for valves and other devices comprising a driven member, a driving motor, a speed reducing connection, a clutch between the motor and the speed reducing connection, means for rendering the clutch responsive to an overload whereby the drive is momentarily rendered ineffective, and means controlled by said means for discontinuing the supply of energy to the motor.

In testimony whereof I have affixed my signature to this specification.

EDWARD F. CHANDLER.